C. W. GRAHAM.
SOLDER FUSING MACHINE.
APPLICATION FILED DEC. 26, 1911.
1,152,410.
Patented Sept. 7, 1915.
2 SHEETS—SHEET 2.
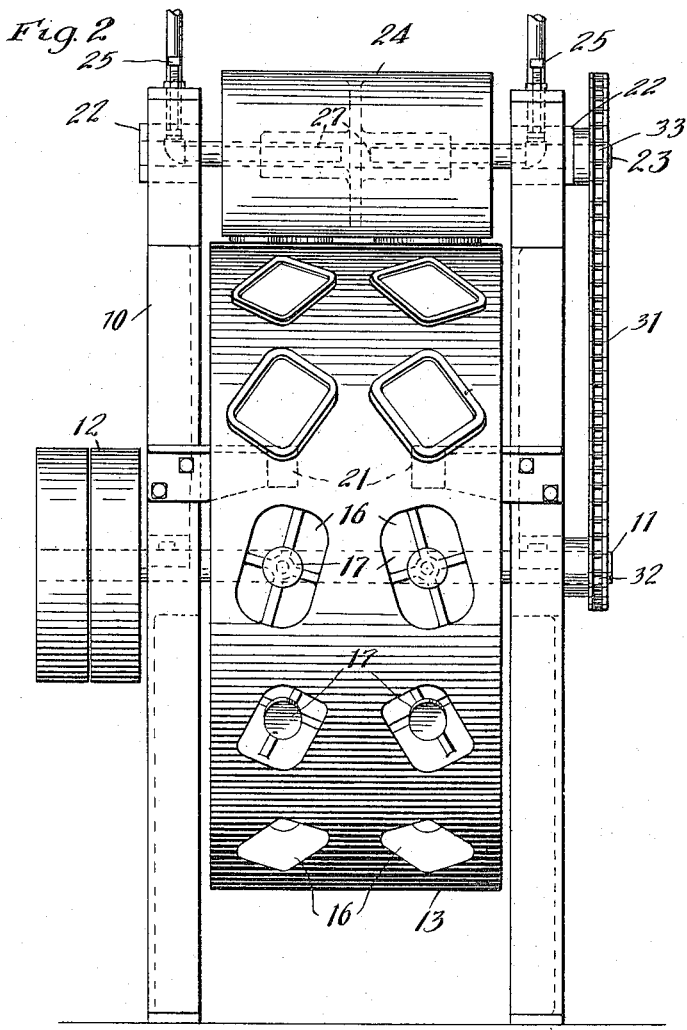
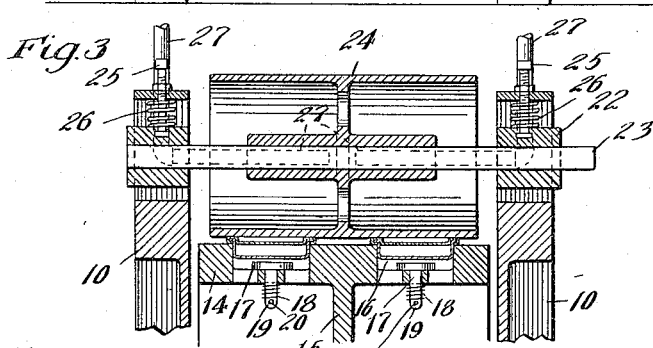
Witnesses:
Wm Geiger
H. W. Munday
Inventor:
Charles W. Graham
By Munday, Evarts, Adcock & Clark,
Attys.

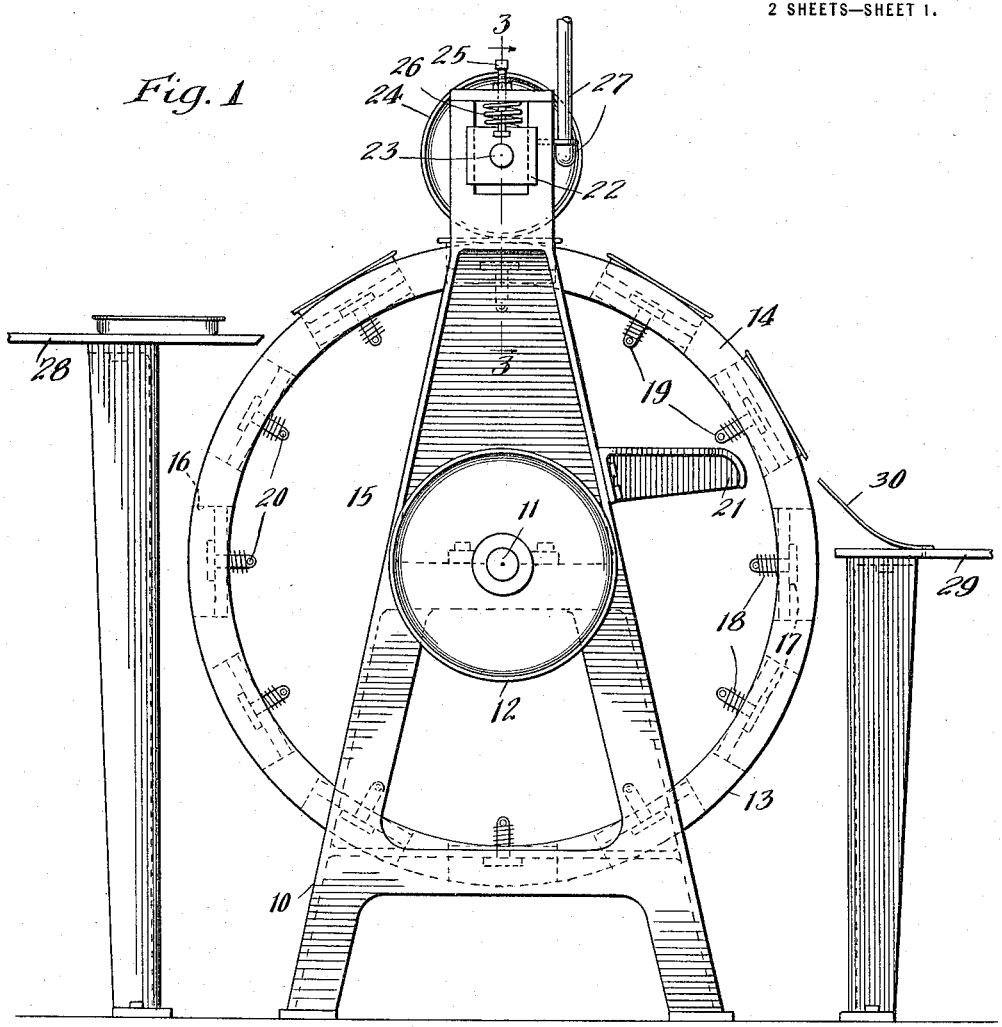

UNITED STATES PATENT OFFICE.

CHARLES W. GRAHAM, OF NEW YORK, N. Y., ASSIGNOR TO AMERICAN CAN COMPANY, OF NEW YORK, N. Y., A CORPORATION OF NEW JERSEY.

SOLDER-FUSING MACHINE.

1,152,410.  Specification of Letters Patent.  Patented Sept. 7, 1915.

Application filed December 26, 1911. Serial No. 667,778.

*To all whom it may concern:*

Be it known that I, CHARLES W. GRAHAM, a citizen of the United States, residing in New York, in the county of New York and State of New York, have invented a new and useful Improvement in Solder-Fusing Machines, of which the following is a specification.

This invention relates to solder fusing machines.

The object of my invention is to provide a mechanism which shall be simple, easy to manufacture, rapid in operation and one wherein the joints formed between can bodies and can covers are fused progressively point by point.

My invention relates more particularly to that type of machine adapted to operate on rectangular shaped cans, or as they are commonly termed in the art, "sardine" cans. But it will be apparent that the structure may equally as well be adapted for use in connection with other forms and shapes of cans.

Another object of my invention is to provide means whereby the seam to be fused is simultaneously subjected to heat and pressure between two surfaces, one a heating pressure surface and the other a cooling pressure surface, these pressure surfaces being so arranged that the seam is substantially entirely free or out of contact with any surface except at a progressively traveling minute area or point which is undergoing the heating and pressing step.

Heretofore, it has been customary to fuse solder seams either by applying heat to the entire seam at once, which heats the can and the contents and gases within the can, if it be filled, and whereby the entire seam is simultaneously heated under pressure, or means have been used to progressively fuse the seam minute area after minute area, but in this method as in the former, one entire side of the seam at least is in contact with one of the pressure devices, while the fusing and setting is being accomplished. Each of the foregoing old methods of soldering has disadvantages, in that the cans operated upon are not always hermetically sealed, owing to the imperfect fusing of the seam at some point. One of the essentials for an efficient fusing machine, especially for one that operates on filled cans, is that each minute area of the seam must be practically simultaneously fused and set and cooled, paradoxical as this may at first appear, and the body of the can and its contents must not have their temperature raised to any appreciable extent, otherwise the gases within the can will be expanded and produce leaks or pin holes.

One form of a machine which I have shown in the drawings for carrying out the object of my invention, and whereby a particularly effective and efficient operation is obtained, comprises a carrier preferably continuously rotatable about a horizontal axis, and provided with a plurality of pockets on the periphery thereof, each pocket being adapted to receive a can having a cover attached thereto to be fused, and in which the carrier acts as the lower pressure surface during the fusing operation, a heated combined pressure and fusing roller rotatable about an axis parallel to the axis of rotation of the carrier, the surface of the roller and the carrier being preferably tangentially disposed relatively to each other, and hence contacting substantially on a single line only. Both the carrier and the roller are preferably positively driven, and each pocket of the carrier may be provided with an ejector.

My invention furthermore consists in the improvements in the parts and devices and in the combinations of parts and devices herein shown and described or claimed.

In the drawing forming a part of this specification, Figure 1 is a side elevation of a machine embodying my improvements. Fig. 2 is an end elevation of the structure disclosed in Fig. 1, with one of the tables removed. Fig. 3 is a detail section, taken substantially on the line 3—3 of Fig. 1.

In the drawings, 10 represents any suitable framework upon which the movable parts are adapted to be mounted. In the frame 10 is rotatably mounted a shaft 11 driven from suitable pulleys 12, and having mounted thereon a cylindrical carrier 13, having a relatively wide rim 14 supported as by means of the web 15. In the rim or periphery 14 of the rotatable carrier are provided preferably a plurality of pockets 16, shaped in accordance with the shape of the cans being operated upon, those in the drawing being shown as rectangular, and having the diagonals thereon arranged parallel to the side edges of the rim 14. The carrier 13 acts as the lower or cooling pressure surface for the cans being operated upon, said surface being curved. Each of the pockets 16 is provided with an ejector 17, normally held inward as by means of a spring 18 encircling the stem 19, and held in place as by means of the pin 20. As shown, the carrier is provided with two sets of rectangular pockets, and has also two cams or ejectors 21, each extending inwardly from a portion of the frame and adapted to operate the ejectors 17. Also mounted in the frame 10 in slidable bearing blocks 22 is a rotatable shaft 23, having keyed thereto a heated combined fusing and pressure roller 24. The bearing blocks 22 are each preferably adjustably and resiliently held in position, as by means of a bolt 25, swiveled in the block 22, and having a spring 26 encircling the same between the block 22 and a portion of the framework. The roller 24 may be heated by any suitable means, as for instance, gas jets 27 extended within the cylinder or roller. The axis of the roller 24 is arranged substantially parallel to the axis of the carrier 13, and the roller 24 is held in engagement with the periphery or rim 14 of the carrier, and as will be obvious, contacts the same substantially only on a line parallel to the said axes.

The cans may be fed to the pockets in the carrier by any suitable means, or by hand, and I have shown a table 28 from which the cans may be fed to the carrier from one side of the machine, and a table 29 adapted to receive the cans as they are ejected from the carrier on the opposite side. The table 29 is also preferably provided with a chute 30 adapted to catch the cans and slide the same onto the table.

The carrier may be positively rotated alone and the roller 24 frictionally driven through contact therewith, but I prefer to have the roller 24 also positively driven as by means of the sprocket chain 31 driven from a gear 32 on the shaft 11, and which in turn drives the gear 33 keyed to the shaft 22.

It will be apparent that the seam or flanges of the can body and can cover, as they are operated upon by the roller, will be engaged on the line of contact between the roller 24 and the carrier 13, and that the remainder of the seam or flanges will be out of contact with either the rim of the carrier 13 or the roller 24, thereby providing a structure in which the fused seams of the can bodies are exposed to the air on both sides and allowed to cool practically instantaneously after the seam has passed from contact between the carrier and the roller.

The machine is adapted to fuse the seams between various forms of can bodies and covers, but the same has been particularly devised for use in connection with sardine cans, in which the flange of the body is provided with a coating of solder and the flange of the cover is bent around or tucked over the body flange.

Various changes may be made in the details of the structure shown and described without departing from the spirit of the invention, and all such changes are contemplated as fairly come within the scope of the appended claims.

I claim:—

1. A fusing machine of the character described comprising, in combination: a fusing device; and a movable cooling pressure device having a curved pressure surface coöperating with said fusing device, said pressure device having a pocket therein within which a can or other article is adapted to be seated and carried bodily by said pressure device past said fusing device, substantially as specified.

2. A fusing machine of the character described, comprising in combination: a fusing device; an axially rotatable cooling pressure device consisting of a hollow cylinder having means thereon for carrying a can or other article, exposed to the air on both its inner and outer sides, bodily past said fusing device; and means for axially rotating said cooling pressure device, substantially as specified.

3. In a can fusing machine, the combination with a fusing and pressing roller, of a rotatable cylindrical carrier having a can body receiving pocket in the circumference thereof and means for directly supporting the can flange in opposition to the fusing roller, said roller and carrier being rotatable about parallel axes and arranged substantially tangentially to each other.

4. In a can fusing machine, in combination, a pressure roller and a rotatable cylindrical carrier having a can body receiving pocket in the circumference thereof, the surface of said carrier forming a curved pressure surface for one side of the seam to be soldered, and coöperating with the pressure roller to act progressively on a constantly changing minute area of the seam.

5. In a can fusing machine, the combination with a pressing and fusing roller, of a rotatable cylindrical carrier having a plurality of can body pockets in the circumference thereof, said carrier and roller being rotatable about parallel axes and tangentially arranged relatively to each other, said carrier having a curved pressure surface adapted to coöperate with the roller while fusing the can seams.

6. In a can fusing machine, the combination with a carrier rotatable about a horizontal axis, and provided with a can body receiving pocket in its circumference and having a curved pressure surface, of a pressure device arranged tangentially to said carrier and normally yieldingly engaging said carrier.

7. In a can fusing machine, the combination with a carrier rotatable about a horizontal axis, and provided with a can body receiving pocket in its circumference, and having a curved pressure surface, of a combined pressure and fusing roller arranged tangentially to said carrier and normally yieldingly engaging said carrier.

8. In a can fusing machine, in combination, a rotatable cylindrical carrier provided with can body receiving pockets in the circumference thereof, the surface of said carrier serving as a curved cooling pressure surface for the seams being operated upon, and a combined pressing and fusing roller mounted tangentially relatively to the carrier, each of said pockets of the carrier being provided with an ejector.

9. In a machine of the class described, in combination, a carrier rotatably mounted on a horizontal axis, and provided with a plurality of can body receiving pockets in the circumference thereof, the cylindrical surface of the carrier serving as a curved cooling pressure surface for the seams being operated upon, and a combined fusing and pressing roller mounted tangentially relatively to the carrier, said carrier and said roller being each positively rotated.

10. In a can fusing machine, in combination, a combined fusing and pressure roller, a rotatable, cylindrical carrier having a can body receiving pocket in the circumference thereof and means for directly supporting the can flange in opposition to the fusing roller, said roller and carrier being rotatable about parallel axes.

CHARLES W. GRAHAM.

Witnesses:
W. D. FOSTER,
WALTER HENRY.

Copies of this patent may be obtained for five cents each, by addressing the "Commissioner of Patents, Washington, D. C."